(12) United States Patent
Yotsumoto

(10) Patent No.: US 8,218,660 B2
(45) Date of Patent: Jul. 10, 2012

(54) RECEIVER

(75) Inventor: Koji Yotsumoto, Machida (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 762 days.

(21) Appl. No.: 12/212,270

(22) Filed: Sep. 17, 2008

(65) Prior Publication Data
US 2009/0086854 A1 Apr. 2, 2009

(30) Foreign Application Priority Data
Oct. 1, 2007 (JP) .................. 2007-257469

(51) Int. Cl.
*H04K 1/10* (2006.01)
*H04J 11/00* (2006.01)
*H04W 4/00* (2009.01)

(52) U.S. Cl. .................. 375/260; 370/208; 370/330

(58) Field of Classification Search .................. 375/260; 370/208, 330
See application file for complete search history.

(56) References Cited

U.S. PATENT DOCUMENTS

| | | | | | |
|---|---|---|---|---|---|
| 4,748,579 | A | * | 5/1988 | Zibman et al. | 708/405 |
| 5,016,641 | A | * | 5/1991 | Schwartz | 600/455 |
| 5,410,750 | A | * | 4/1995 | Cantwell et al. | 455/306 |
| 6,300,895 | B1 | * | 10/2001 | Carrara et al. | 342/55 |
| 6,449,246 | B1 | * | 9/2002 | Barton et al. | 370/210 |
| 2004/0008614 | A1 | * | 1/2004 | Matsuoka et al. | 370/203 |
| 2005/0047513 | A1 | * | 3/2005 | Vitenberg | 375/260 |
| 2005/0073948 | A1 | * | 4/2005 | Jwa | 370/208 |
| 2006/0007888 | A1 | * | 1/2006 | Lee et al. | 370/330 |
| 2007/0071123 | A1 | * | 3/2007 | Charbit | 375/260 |
| 2010/0039925 | A1 | * | 2/2010 | Bhushan et al. | 370/204 |

FOREIGN PATENT DOCUMENTS
JP 2002-261720 9/2002
* cited by examiner

*Primary Examiner* — David C. Payne
*Assistant Examiner* — Sarah Hassan
(74) *Attorney, Agent, or Firm* — Brundidge & Stanger, P.C.

(57) ABSTRACT

In a receiver to process a received signal including one or more carrier signals, an FFT processing section executes FFT processing on the received signal to obtain FFT processing results at, for example, four points. On the basis of the FFT processing results from the FFT processing section, a selecting section selects one point from a plurality of, e.g., four points. An FFT processing result corresponding to the point selected by the selecting section is used for demodulation processing.

3 Claims, 5 Drawing Sheets

US 8,218,660 B2

RECEIVER

INCORPORATION BY REFERENCE

The present application claims priority from Japanese application JP 2007-257469 filed on Oct. 1, 2007, the content of which is hereby incorporated by reference into this application.

BACKGROUND OF THE INVENTION

The present invention relates to a receiver which conducts, for example, Fast Fourier Transform (FFT) for a received signal to demodulate a carrier signal contained in the received signal, and in particular, to a receiver capable of improving quality of signal reception even if interference occurs between carriers.

For example, an Orthogonal Frequency Division Multiplexing (OFDM) scheme is employed as a communication scheme in a mobile communication system and the like.

FIG. 5 shows an example of a configuration of an OFDM receiver to receive an OFDM signal which is modulated by a transmission side (an OFDM transmitter) using an OFDM scheme and which is transmitted by radio therefrom.

In FIG. 5, the similar processing sections as those of FIGS. 1 and 4, which will be referred to for embodiments later, are assigned with the same reference numerals. However, this does not intend to restrict the present invention.

In the OFDM receiver of this example, the OFDM signal sent from the transmission side is received by an antenna 1, the received signal is processed by a Radio Frequency (RF) section 2, and the processed signal is then converted by an Analog to Digital (A/D) converter 3 from an analog signal into a digital signal at sampling timing of n MHz. The digital signal is converted by a Serial to Parallel (S/P) converter 31 from a serial signal into a parallel signal. The parallel signal is inputted to a guard interval remover 32 and an FFT section 33.

In the guard interval remover 32, a guard interval signal portion is removed from the parallel signal. In the FFT section 33, N-point FFT processing is conducted for a signal portion of data to produce N FFT results. The signals of N FFT processing results are demodulated by demodulators A(1) to A(N) respectively associated therewith. The N demodulation resultant signals constituting a parallel signal are converted by a Parallel to Serial (P/S) converter 8 from a parallel signal into a serial signal.

As the value of n (sampling frequency) for the sampling timing of the A/D converter 3, there is used an arbitrary value (e.g., the value of a sampling rate required in the OFDM scheme). As the value of N for the FFT processing in the FFT section 33, there is employed, for example, a value equal to or slightly less than the number of carriers (subcarriers) contained in the OFDM signal.

It has been known that the OFDM scheme is resistive against multi-path interference. On the other hand, there exists a problem that the OFDM scheme is prone to be influenced by the shift in the frequency (e.g., the value associated with the Automatic Frequency Control (AFC)), the Doppler shift, and the jitter that are caused when the OFDM scheme is used in mobile devices.

FIG. 6 shows an example of a waveform of the OFDM signal with distortion in which the abscissa represents the frequency.

Such distortion is caused due to the narrow carrier interval in the OFDM scheme, specifically, by the Inter Carrier Interference (ICI) for the variation with respect to the frequency axis such as the frequency shift, the Doppler shift, and the jitter. Particularly, for a high-speed mobile unit, it is essential to solve the problem of ICI caused by the Doppler shift.

The OFDM scheme is strong against the multi-path interference because of presence of the guard interval. However, the orthogonality is disturbed by the multi-path, causing the frequency-selective fading. As a result, although partially, there inevitably takes place the problem of ICI.

Reference may be made to JP-A-2002-261720.

SUMMARY OF THE INVENTION

As above, the OFDM scheme is attended with a problem, that is, the OFDM scheme is weak against the inter-carrier interference, specifically, the frequency shift, the Doppler shift, and the jitter. Hence, it is desired to develop an OFDM receiver resistive against the inter-carrier interference.

It is therefore an object of the present invention, which has been devised to solve the problem, to provide a receiver capable of improving quality of signal reception even if interference occurs between carriers.

To achieve the object according to an aspect of the present invention, a receiver to process a received signal including one or more carrier signals is constructed as below.

That is, an FFT processing section executes FFT processing for the received signal to obtain FFT processing results at a plurality of points for each carrier. A selecting section selects one point from the plural points for each carrier on the basis of the FFT processing results from the FFT processing section.

An FFT processing result corresponding to the point selected by the selecting section is used for demodulation processing.

Therefore, for each carrier, there can be obtained FFT processing results at a plurality of points. By selecting one of the points, the quality of signal reception can be improved even in the case, for example, inter-carrier interference exists.

As the receiver, there may be used not only a receiver having only a receiver function, but also a receiver having both of a receiver function and a transmitter function.

The number of carrier signals contained in the received signal may be various number.

For example, an OFDM receiver to receive an OFDM signal may be used as the receiver. An OFDM signal containing a plurality of carriers (subcarriers) may be used as the signal to be communicated, i.e., as the received signal.

The results of FFT processing include, for example, I and Q components in a frequency domain.

Also, various configurations may be used to obtain the results of FFT processing at a plurality of points for each carrier.

The point associated with each FFT processing result indicates a point of a frequency in a frequency domain.

Various methods may also be adopted to select one of the points for each carrier.

In the demodulation processing, the FFT processing results used for the selection of the point may be used. Alternatively, instead of using the FFT processing results used for the point selection, FFT processing results that will be subsequently obtained at the same point may be used in the demodulation processing.

The receiver according to the present invention is implemented in a configuration example as below (corresponding to FIG. 1), assuming that m is an integer equal to or larger than 2.

The FFT processing section executes the FFT processing for the received signal in a time domain for a sampling period of time which is m times the interval of the FFT process to thereby obtain FFT processing results at m points for each carrier. The selecting section selects one point from the m points for each carrier on the basis of the FFT processing results from the FFT processing section, the one point being a point at which the level of the FFT processing result for the carrier becomes maximum.

As above, for each carrier, there are obtained FFT processing results at a plurality of points. By selecting one of the points at which the level of the FFT processing result takes a maximum value, it is possible to improve the quality of signal reception even in the case where, for example, inter-carrier interference exists.

In this situation, various values may be used as m.

Also, as the level of the FFT processing result, there may be used various levels, for example, power and amplitude as well as a result of averaging operation.

The receiver according to the present invention is implemented in another configuration example as below (corresponding to FIG. 4), assuming that m is an integer equal to or larger than 2.

In the receiver, a sampling section samples the received signal in a time domain. A distributing section sequentially distributes time-series sampling results from the sampling section to m groups.

The FFT processing section executes FFT processing for the sampling results respectively of the m groups distributed by the distributing section. The selecting section selects one point from the m groups of points for each carrier on the basis of the FFT processing results from the FFT processing section, the one point being a point at which the level of the FFT processing result for the carrier is maximum.

As above, for each carrier, there are obtained FFT processing results at points of a plurality of groups. By selecting one of the points at which the level of the FFT processing result takes a maximum value, it is possible to improve the quality of signal reception even in the case where, for example, inter-carrier interference exists.

In this situation, various values may be employed as m.

Also, as the level of the FFT processing result, there may be used various levels, for example, power and amplitude as well as a result of averaging operation.

Additionally, the points of m groups in each carrier have respectively different phases in the frequency domain.

The present invention may also be provided in the form of a method, a program, a recording medium, and the like.

In a method according to the present invention, respective units and sections of an apparatus and a system execute various processing.

A program according to the present invention is to be executed by a computer constituting an apparatus and a system and makes the computer serve functions as various units and sections.

A recording medium according to the present invention is a computer-readable medium having recorded thereon a program to be executed by a computer constituting an apparatus and a system. The program is readable by an input unit of the computer. The program makes the computer execute various processings (procedures).

As described above, in a receiver according to the present invention, from a received signal including one or more carrier signals, there are obtained, for each carrier, FFT processing results at a plurality of points to select one of the points for subsequent processing. It is hence possible to improve the quality of signal reception even in the case where inter-carrier interference exists, for example.

Other objects, features and advantages of the invention will become apparent from the following description of the embodiments of the invention taken in conjunction with the accompanying drawings.

DETAILED DESCRIPTION OF THE EMBODIMENTS

Figure 1:
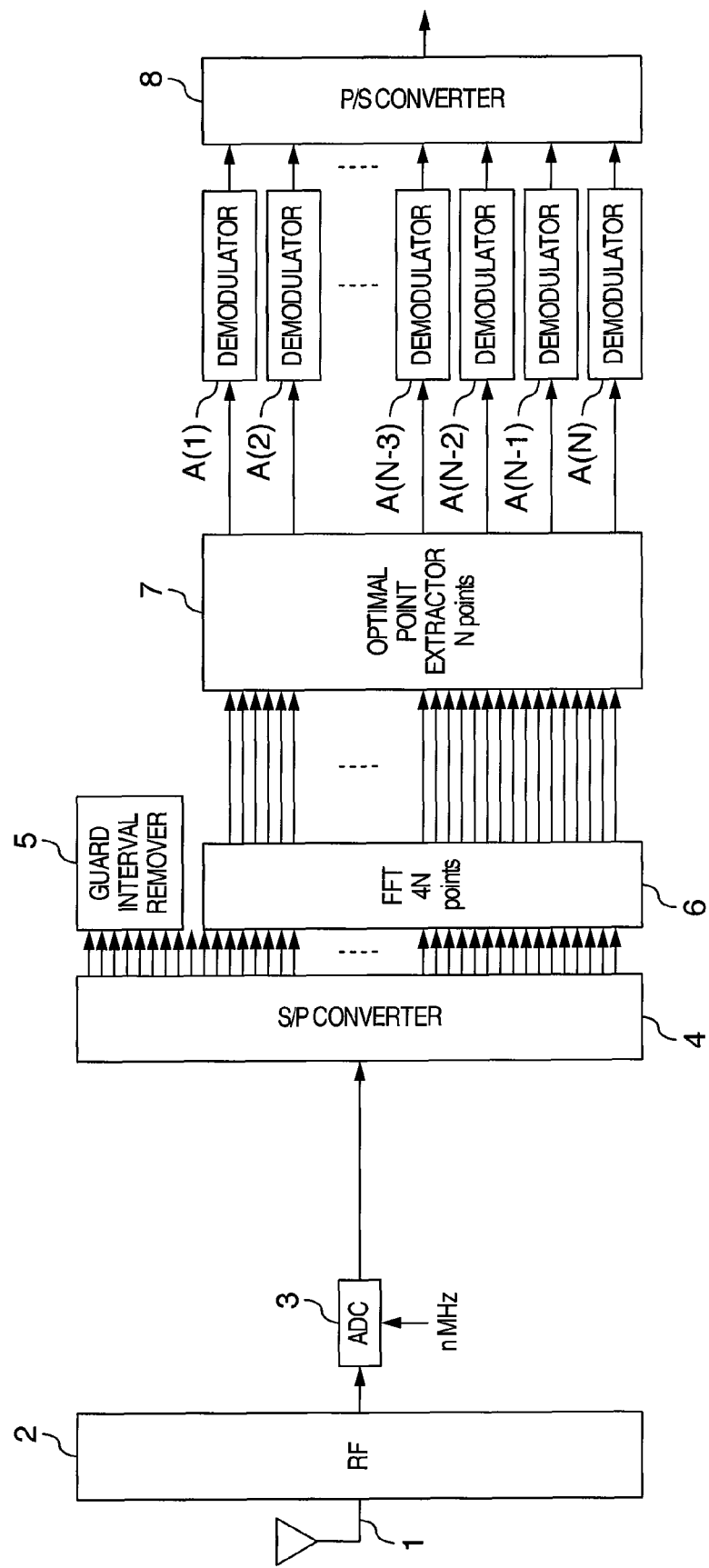
FIG. 1 is a block diagram showing a configuration example of a first embodiment of an OFDM receiver of the present invention.

Referring now to the drawings, description will be given of an embodiment according to the present invention.
[First Embodiment]

Description will be given of a first embodiment of the present invention.

FIG. 1 shows a configuration example of a first embodiment an OFDM receiver of the present invention.

The OFDM receiver includes an antenna 1, an RF section 2, an A/D converter 3, an S/P converter 4, a guard interval remover 5, an FFT section 6, an optimal point extractor 7, N demodulators A(1) to A(N), and a P/S converter 8.

The A/D converter 3 receives as an input signal a sampling timing signal of n MHz (e.g., a clock signal).

The S/P converter 4 processes a signal having a length which is four times that of the guard interval portion and the FFT processing period.

The FFT section 6 executes FFT processing at 4N points.

The optimal point extractor 7 executes optimal point extraction on N points.

As the value of n (sampling frequency) associated with the sampling timing of the A/D converter 3, an arbitrary value (e.g., the value of the sampling rate required in the OFDM scheme) may be used. As the value of N associated with the FFT processing in the FFT section 6, the number of carriers (subcarriers) contained in the OFDM signal is used in the embodiment. However, in practice, a value slightly less than the number of carriers may be used.

Figure 5:
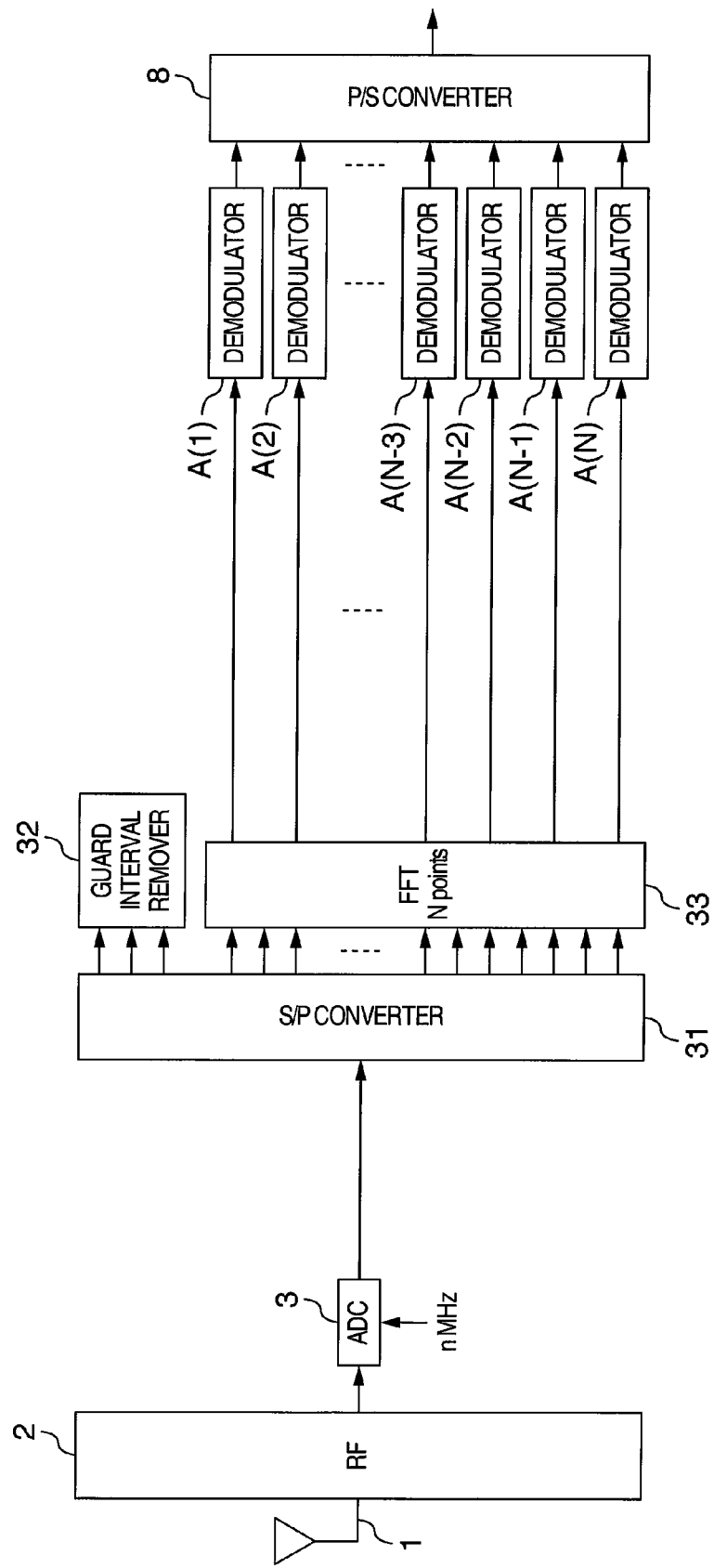
FIG. 5 is a diagram showing an example of structure of an OFDM receiver.
Figure 6:
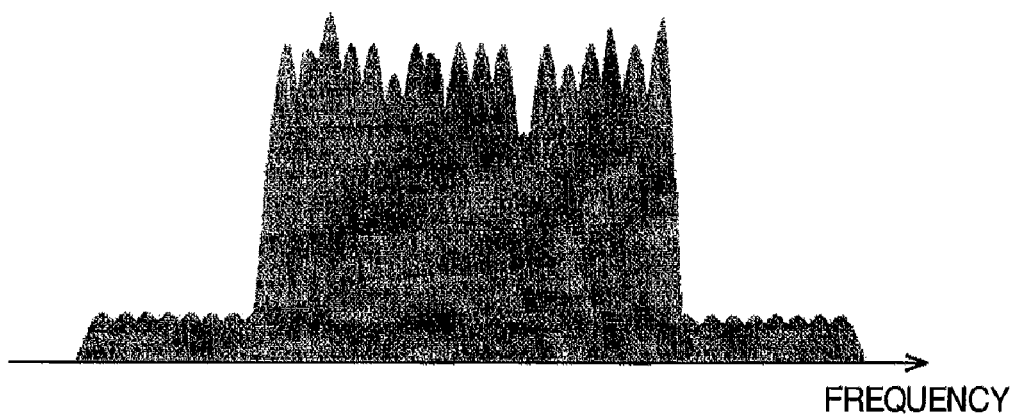
FIG. 6 is a graph showing an example of an OFDM signal waveform including distortion.

For n and N, it is possible to use the values employed, for example, in the conventional OFDM receiver shown in FIG. 5.

Figure 2:
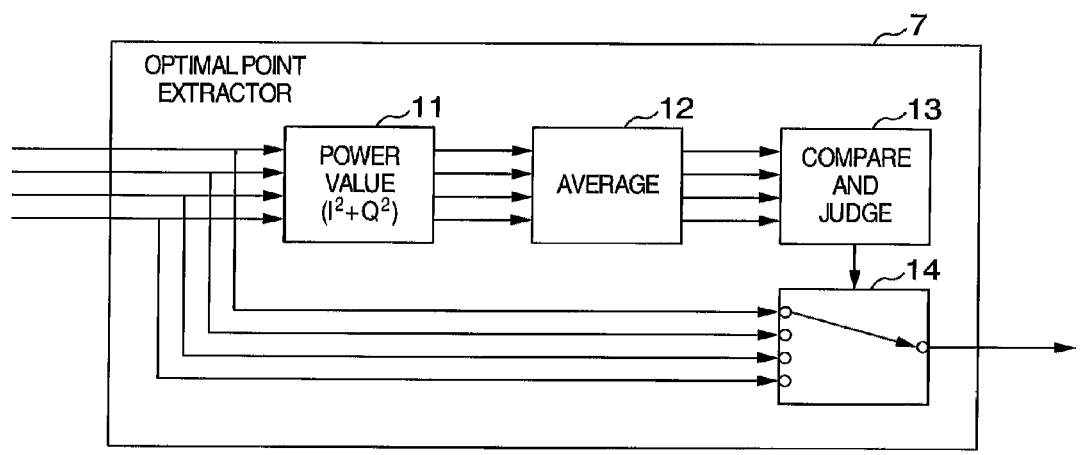
FIG. 2 is a diagram showing an example of structure of an optimal point extractor.

FIG. 2 shows a configuration example of the optimal point extractor 7 for one carrier.

The extractor 7 includes a power value section 7, an averaging section 12, a judge section 13, and a switch section 14.

As in this example, if it is desired to extract an optimal point for a plurality of carriers (N carriers in this example), there is employed, for example, a configuration wherein processing sections 11 to 14 which execute processing for one carrier as shown in FIG. 2 are operated for a plurality of carriers in a time-division fashion or a configuration wherein the processing sections 11 to 14 which execute processing for one carrier as shown in FIG. 2 are arranged in parallel for a plurality of carriers.

Although FIG. 2 shows a configuration in which the optimal point extractor 7 is constituted of a plurality of processing sections 11 to 14, the extractor 7 may also be implemented using the function of carrying out the processing of these sections 11 to 14 by computational operations (for example, by use of a Central Processing Unit (CPU)).

Description will be given of an example of operation conducted by the OFDM receiver of this example.

In an OFDM transmitter, not shown, a transmission object such as data is modulated in the OFDM scheme and is transmitted by radio from an antenna.

The antenna 1 receives the (OFDM) signal wirelessly sent from the OFDM transmitter and outputs the received signal to the RF section 2.

The RF section 2 conducts processing, e.g., a frequency conversion for the received signal from the antenna 1 and delivers the resultant received signal to the A/D converter 3.

The A/D converter 3 converts the received signal from an analog signal into a digital signal at sampling timing of n MHz and sends the digital signal to the S/P converter 4.

The S/P converter 4 converts the digital signal received from the A/D converter 3 from a serial signal into a parallel signal, namely, changes the arrangement of the data sequence and outputs the parallel signal to the guard interval remover 5 and the FFT section 6. In this example, the S/P converter 4 processes a signal having a length which is four times that of the guard interval portion and the FFT processing period.

The guard interval remover 5 receives a signal part of the guard interval contained in the parallel data sequence sent from the S/P converter 4 to thereby remove the signal part.

In general, the OFDM signal includes a guard interval signal and a data signal.

In the OFDM receiver of this example, the guard interval timing (signal position) is determined as follows. For example, information regarding the guard interval timing (signal position) is beforehand set to a memory, or, alternatively, the received signal (OFDM signal) is analyzed to determine the timing.

The FFT section 6 receives the data signal part of the parallel data sequence from the S/P converter 4, executes 4N-point FFT processing for the data, and then outputs 4N FFT processing results obtained through the FFT processing to the optimal point extractor 7. In the FFT processing, a signal in a time domain is converted into a signal in a frequency domain.

Specifically, compare the operation of the S/P converter 31 and the FFT section 33 (conventional example) shown in FIG. 5 with that of the S/P converter 4 and the FFT section 4 of the present example. While the S/P converter 3 accumulates signals for a period of time T in the prior art, the S/P converter 4 accumulates signals for a period of time 4T in this example. Also, while the FFT section 33 conducts N-point FFT processing in the prior art, the FFT section 6 conducts 4N-point FFT processing in this example. Hence, resolution in terms of the FFT processing results (signals on the frequency axis) of the present example is four times that of the conventional example.

The FFT section 33 of the prior art differs from the FFT section 6 of the present example in operation scale when the FFT section is implemented by DSP or CPU or in circuit scale when it is implemented by FPGA.

The optimal point extractor 7 extracts (selects), from the 4N FFT processing results (converted data in a frequency domain) received from the FFT section 6, one FFT processing result at a sampling point regarded as an optimal sampling point for each carrier (subcarrier) contained in the OFDM signal and outputs the FFT processing result to one of the demodulators A(1) to A(N) associated with the carrier. This example shows a situation in which the OFDM signal includes N carriers.

The respective demodulators A(1) to A(N) demodulate the associated FFT processing results from the optimal point extractor 7 to output the demodulated results to the P/S converter 8.

The P/S converter 8 receives the parallel data sequence from the N demodulators A(1) to A(N) and converts the parallel signal into a serial signal to deliver the serial signal to a subsequent section.

Description will be given in detail of an example of operation conducted by the optimal point extractor 7 of this example.

Assume that the processing is executed for one carrier (subcarrier). Assume also that four input data items (FFT processing results) exist for one carrier in this example. In the OFDM receiver of the example, information such as a bandwidth of each carrier is set and stored in a memory in advance.

Four input data items are inputted for one carrier from the FFT section 6 to the power value section 11 and the switch section 14, as shown in FIG. 2. Each input data item is ordinarily modulated into an I component (to be referred to as I hereinbelow) and a Q component (to be referred to as Q hereinbelow).

The power value section 11 calculates a power value ($I^2 + Q^2$ in this example) for each of the four input data items to output the power value to the averaging section 12.

The averaging section 12 keeps each power value data item (power value) received from the power value section 11 in an internal memory or a circuit for each of the four input data items to calculate a mean value between sequentially inputted data item and the data items kept therein. Each time the averaging operation is conducted for, for example, a predetermined period of time (or for a predetermined number of times), the averaging section 12 produces mean (average) values of the four input data items and outputs the mean values to the judge section 13.

The period of time (or the number of times) to conduct the averaging operation is not particularly restricted. For example, if the averaging is conducted for a long period of time (a large number of times), it is possible to extract (compensate for) the frequency shift. If the averaging is conducted for a short period of time (a small number of times), the Doppler shift is reduced.

The judge section 13 processes the four averaged data items (results of the averaging operation; fully averaged for practice) from the averaging section 12. For example, the judge section 13 compares levels of power values with each other to determine that a sampling point at which the level takes a maximum value is an optimal point for the channel. The judge section 13 then outputs information (to control the switch section 14) which identifies timing (a frequency position) of the optimal point, to the switch section 14.

The switch section 14 conducts a changeover operation to select, from the four input data items, one input data item associated with the timing of the optical point identified by the information (resultant from the judgment of optimal point timing) from the judge section 13. The switch section 14 sends the selected input data to one of the demodulators A(1) to A(N) for an associated channel.

Figure 3:
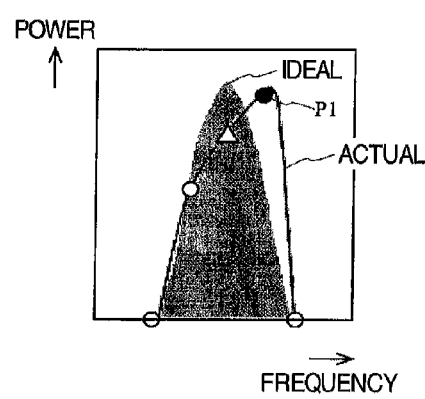
FIG. 3 is a graph showing an example of results of sampling detection for a subcarrier.

FIG. 3 shows an example of sampling point detection for one carrier (subcarrier). The abscissa represents the frequency and the ordinate represents power (average power).

FIG. 3 also shows an example of an ideal signal and an actually obtained signal in a frequency domain.

In this example, over-sampling FFT processing is executed to detect one carrier at a plurality of points. The averaging operation is carried out in a frequency domain to extract an optimal point in a frequency domain.

FIG. 3 shows an example of detection of one carrier at a plurality of points.

In the example of FIG. 3, the average power takes a maximum value at point P1 and hence timing at point P1 is selected as optimal point timing.

If the OFDM signal includes distortion, the optimal point may differ from the ordinary peak point (ideal peak point) depending on cases. Since the distortion varies for each frequency, the optimal point timing may vary between the carriers (subcarriers). Hence, the extracted optimal points (FFT points) are not necessarily equally spaced.

In the OFDM receiver of the example described above, the FFT processing results are obtained at a plurality of points for the channel of each carrier (subcarrier). By comparing the levels of the results in a frequency domain with each other, a point of an optimal timing (frequency position) is extracted. Specifically, as compared with, for example, the configuration of the prior art example shown in FIG. 5, the OFDM signal in a time domain is FFT processed for a sampling period of time m times (m=4 in this example) that of the prior art in the present example such that, for each carrier, levels are detected at a number of points which is m times that of the prior art. Timing (frequency point) of a point at which the level takes a maximum value is then selected for each carrier to be used for subsequent processing.

Therefore, even in a case where the distortion varies for each frequency since, for example, the user may differ for each carrier (subcarrier) or the characteristic of the receiver may vary for each frequency, the OFDM receiver of this example makes it possible to reduce the distortion of each carrier (for example, to a minimum distortion) in the processing of the received OFDM signal. Hence, it is possible to improve the interference between carriers caused by the frequency shift, the Doppler shift, and the jitter.

The processing means and the selection means in the receiver of this example are constituted such that the FFT processing means is constituted by the function of the FFT section 6 which executes FFT processing on the received signal in time domain other than the guard interval for a sampling period of time corresponding to m times the interval of FFT process (m=4 in this example) taken by the S/P converter 4 with respect to the sampling results from the A/D converter 3 and obtains FFT processing results at m points for each carrier and that the selection means is constituted by the function of the optimal point extractor 7 which selects (extracts) one point from the m points for each carrier, the one point being a point at which the level (average power in this example) of the FFT processing result for the carrier takes a maximum value.

[Second Embodiment]

Description will now be given of a second embodiment of the present invention.

Figure 4:
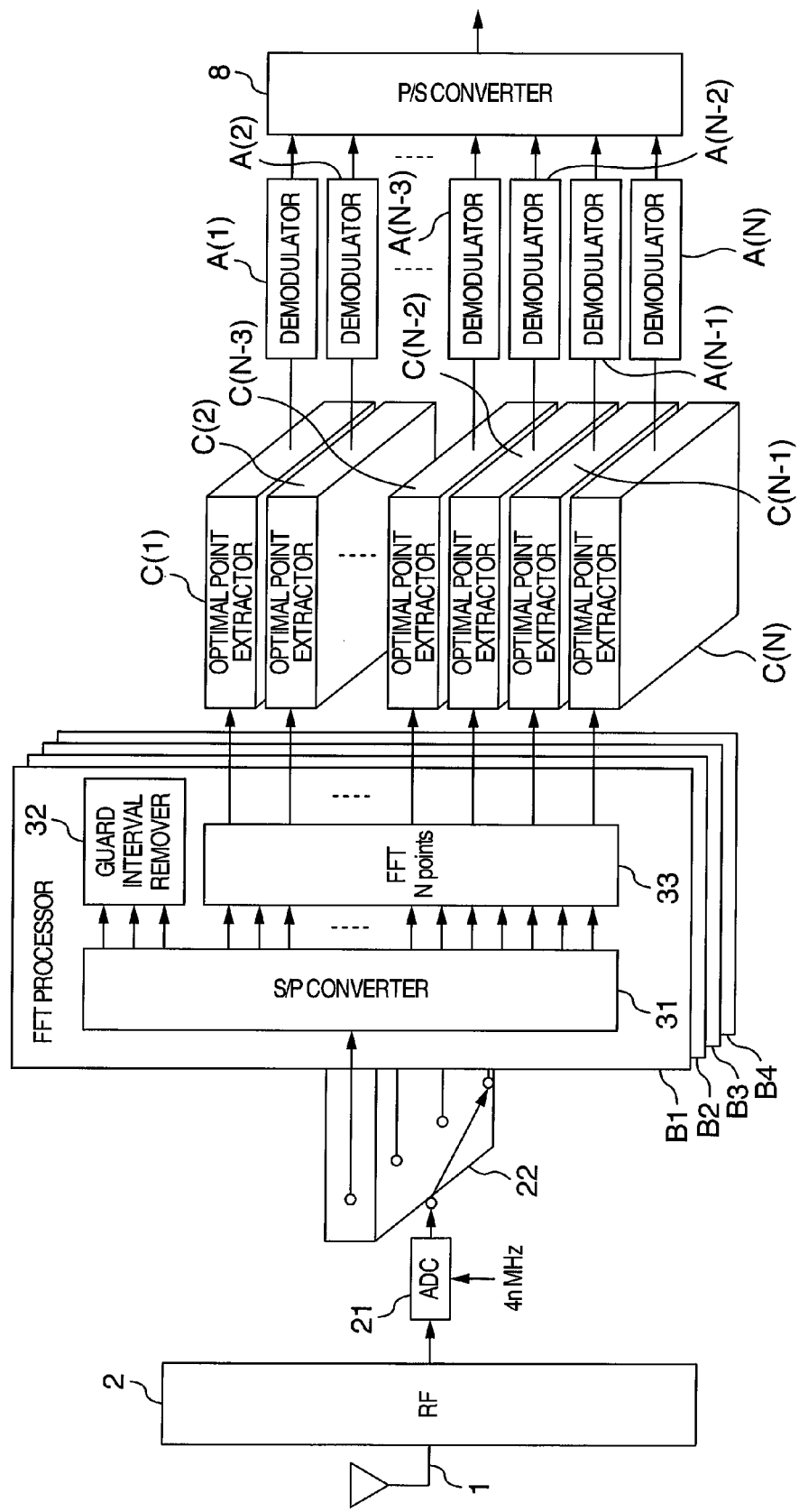
FIG. 4 is a block diagram showing a configuration example of a second embodiment of an OFDM receiver of the present invention.

FIG. 4 shows a configuration example of an OFDM receiver in this embodiment. In FIG. 4, the same constituent components as those of FIG. 1 are assigned with the same reference numeral for convenience of description.

The OFDM receiver includes an antenna 1, an RF section 2, an A/D converter 21, a switch section 22, four FFT processing sections B1 to B4, N optimal point extractors C(1) to C(N), N demodulators A(1) to A(N), and a P/S converter 8.

The FFT processing sections B1 to B4 are similar in structure and operation to each other. Each of the FFT processing sections B1 to B4 includes an S/P converter 31, a guard interval remover 32, and an FFT section 33.

Each of the optimal point extractors C(1) to C(N) may be similar in structure and operation to, for example, the optimal point extractor shown in FIG. 2.

The A/D converter 21 receives a signal (e.g., a clock signal) of 4n MHz sampling timing.

The S/P converter 31 processes a signal having a length substantially equal to that of the guard interval and the FFT period (period equal to ×1 FFT period).

The FFT section 33 executes N-point FFT processing.

Each of the optimal point extractors C(1) to C(N) executes optimal point extraction processing for one point.

The value of 4n (sampling frequency) for the sampling timing of the A/D converter 21 may be an arbitrary value (for example, a value which is four times the sampling rate required in the OFDM scheme). The value of N for the FFT processing in the FFT section 33 is a value of the number of carriers (subcarriers) contained in the OFDM signal in the example. However, actually, a value slightly less than the value of the number of carriers may be used in practice.

Also, the values of n and N may be the same as those used in, for example, the conventional OFDM receiver shown in FIG. 5.

Description will now be given of an example of operation conducted in the OFDM receiver of the example.

In an OFDM transmitter, not shown, a transmission object such as data is modulated in the OFDM scheme and is transmitted by radio from an antenna.

The antenna 1 receives the (OFDM) signal wirelessly sent from the OFDM transmitter and outputs the received signal to the RF section 2.

The RF section 2 conducts processing, e.g., a frequency conversion for the received signal from the antenna 1 and delivers the resultant received signal to the A/D converter 21.

The A/D converter 21 converts the received signal from the R/F section 2 at sampling timing of 4n MHz from an analog signal into a digital signal and sends the digital signal to the switch section 22.

The switch section 22 receives the digital signal (data) in a time series from the A/D converter 21 to output the digital signal to the destination, i.e., the four FFT processing sections B1 to B4 by sequentially conducting a changeover operation between the FFT processing sections B1 to B4. Specifically, data items from the A/D converter 21 are periodically outputted to the FFT processing sections B1 to B4 in a circular fashion, such that, for example, a certain data item form the A/D converter 21 is outputted to the FFT processing section B1, a second data item is delivered to the section B2, a third data item is delivered to the section B3, and a third data item is delivered to the section B4. As a result, each of the FFT processing sections B1 to B4 receives a sequence of data items associated with the same sampling timing.

The respective FFT processing sections B1 to B4 conduct similar processing for data inputted to respective sections B1 to B4. Description will now be collectively given of the processing.

The S/P converter 31 converts the digital signal (data) received from the switch section 22 from a serial signal into a parallel signal, namely, changes the arrangement of the data sequence and outputs the parallel signal to the guard interval remover 32 and the FFT section 33. In this example, the S/P converter 31 processes a signal having a length ×1 (equal to) that of the guard interval and the FFT processing period.

The guard interval remover 32 receives a signal part of the guard interval contained in the parallel data sequence sent from the S/P converter 31 to thereby remove the signal part.

In general, the OFDM signal includes a guard interval signal and a data signal.

In the OFDM receiver of this example, the guard interval timing (signal position) is determined as follows. For example, information regarding the guard interval timing (signal position) is beforehand set to and stored in a memory, or, alternatively, the received signal (OFDM signal) is analyzed to determine the timing.

The FFT section 33 receives the data signal part of the parallel data sequence from the S/P converter 31, executes N-point FFT processing on the data, and then outputs N FFT processing results obtained through the FFT processing to the optimal point extractors C(1) to C(N) corresponding to the respective carriers (subcarriers). In the FFT processing, a signal in a time domain is converted into a signal in a frequency domain.

The optimal point extractors C(1) to C(N) are associated with mutually different carriers and conduct similar operations on the FFT processing results respectively from the FFT processing sections B1 to B4. Specifically, each of the optimal point extractors C(1) to C(N) extracts (selects) from the four FFT processing results (data converted into a frequency domain) received from (associated one of the FFT sections 33 of) the FFT processing sections B1 to B4, an FFT processing result at one sampling point regarded as an optimal sampling point for each carrier (subcarrier) contained in the OFDM signal and outputs the FFT processing result to one of the demodulators A(1) to A(N) corresponding to the carrier. This example shows a situation in which the OFDM signal includes N carriers.

In the present example, each of the optimal point extractors C(1) to C(N) specifically conducts operation similar to that shown in FIG. 2.

Additionally, plural data items for one carrier (subcarrier) are in mutually different phase relation with each other. The difference in sampling timing appears as the difference in phase in a frequency domain.

The respective demodulators A(1) to A(N) demodulate the associated FFT processing results from the optimal point extractors C(1) to C(N) to output the demodulated results to the P/S converter 8.

The P/S converter 8 receives the parallel data sequence from the N demodulators A(1) to A(N) and converts the parallel signal into a serial signal to deliver the serial signal to an external device.

Specifically, compare the configuration (conventional example) shown in FIG. 5 with that of the present example. While the sampling frequency of the A/D converter 3 is n MHz in the conventional example, the sampling frequency of the A/D converter 21 is four times that of the A/D converter 3, i.e., 4n MHz. In the conventional example, the FFT processing is executed by one FFT processing section (including the S/P converter 31, the guard interval remover 32, and the FFT section 33). Further, in this example, the FFT processing is executed by the four FFT processing sections B1 to B4, which means in effect that, while the FFT section 33 executes N-point FFT processing in the prior art, the FFT sections 3 respectively of the four FFT processing sections B1 to B4 execute 4 times point (4N-point) FFT processing. When compared with the conventional example, resolution of the FFT processing results (signals on the frequency axis) of the present example is four times that of the prior art.

In the OFDM receiver of the example described above, the FFT processing results are obtained at a plurality of points for the channel of each carrier (subcarrier). By comparing the levels of the results in a frequency domain, a point of an optimal timing (phase) is extracted. Specifically, as compared with, for example, the configuration of the prior art example shown in FIG. 5, the A/D converter 21 conducts the oversampling which is m times that of the prior art (m=4 in this example) to attain data. All data thus obtained is converted through the FFT processing into data in a frequency domain to detect levels at a number of points which is m times that of the prior art for each carrier. Timing (phase) of a point at which the level takes a maximum value is then selected for each carrier to be used for subsequent processing.

Therefore, even in a case where the distortion varies for each frequency since, for example, the user may differ for each carrier (subcarrier) or the characteristic of the receiver may vary for each frequency, the OFDM receiver of this example makes it possible to reduce the distortion of each carrier (for example, to a minimum distortion) in the processing of the received OFDM signal. Hence, it is possible to improve the interference between carriers caused by the frequency shift, the Doppler shift, and the jitter.

Although the configuration of the present example is such that the different FFT processing sections B1 to B4 are provided respectively for the four sampling timing points, it is possible to employ, for example, another configuration in which only one FFT processing section is used and data items of the respective sampling timing points are stored in a memory, wherein the single FFT processing section is operated in a time-division fashion to be sequentially used for each sampling timing. Also in this situation, as in the present example, the data converted through the FFT processing into data in a frequency domain is processed such that data items associated with, for example, a channel of the same carrier (subcarrier), i.e., the same frequency, are gathered for the optimal point extraction processing for each carrier.

In the receiver of this example, the sampling means is constituted of the function of the A/D converter 21 which samples (or A/D converts, in this example) the received signal in a time domain, the distribution means is constituted of the function of the switching section 22 which sequentially distributes time-series sampling results to m (m=4 in this example) groups (FFT processing sections B1 to B4 in this example), the FFT processing means is constituted of the function of the FFT section 33 of each of the FFT processing sections B1 to B4 which executes FFT processing on respective sampling result inputted thereto to thereby obtain FFT processing results at m points for each carrier, as a whole, and the selection means is constituted of the function of each of the optimal point extractors C(1) to C(N) corresponding to respective one of carriers (subcarriers) which selects (extracts) one point from the m points for each carrier, the one point being a point at which a level of the FFT processing result (averaged power in this example) becomes maximum.

The present invention is not restricted by the configurations of the systems and the apparatuses described above. That is, various configurations may also be employed according to the present invention. The present invention may be provided as a method or a scheme to execute the processing according to the present invention, a program to implement such method or scheme, or a recording medium having stored therein the program. It is also possible to provide the present invention in the form of various systems and apparatuses.

The present invention is not necessarily restricted by the application fields described above, but is also applicable to various fields.

Various processing to be executed in the systems and apparatuses according to the present invention may be configured as follows.

In a hardware resource including, for example, a processor and a memory, the processor executes a control program stored in a Read Only Memory (ROM) to thereby control the various processing. Additionally, for example, each functional module to execute the various processing may be configured as an independent hardware circuit.

Also, the present invention may be regarded as a computer-readable recording medium such as a floppy (registered trademark) disk, a Compact Disc (CD) ROM having stored the control program or the control program (per se). By inputting the control program from the recording medium to a computer to execute the program by a processor, it is possible to execute processing according to the present invention.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A receiver for processing an Orthogonal Frequency Division Multiplexing (OFDM) signal as a received signal including one or more carrier signals, comprising:
   Fast Fourier Transform (FFT) processing means for executing FFT processing for the received signal to obtain FFT processing results at a plurality of points for each carrier; and
   selection means for selecting one point from plural points for each carrier based on the FFT processing results from the FFT processing means,
   wherein an FFT processing result corresponding to the one point selected by the selection means is used for demodulation processing,
   wherein the FFT processing means executes the FFT processing for the received signal in a time domain for a sampling period of time which is m times an interval of the FFT process to thereby obtain FFT processing results at m points for each carrier, where m is an integer equal to or more than two,
   wherein the selection means selects the one point from the m points for each carrier based on the FFT processing results from the FFT processing means, the one point being a point at which a level of the FFT processing result for the carrier becomes maximum, and
   wherein the selection means includes for each carrier judge means which compares levels of power values of the FFT processing results with each other to determine that the point at which the level of the FFT processing result becomes a maximum value is an optimal point for the carrier.

2. A receiver for processing an Orthogonal Frequency Division Multiplexing (OFDM) signal as a received signal including one or more carrier signals, comprising:
   Fast Fourier Transform (FFT) processing means for executing FFT processing for the received signal to obtain FFT processing results at a plurality of points for each carrier;
   selection means for selecting one point from plural points for each carrier based on the FFT processing results from the FFT processing means,
   wherein an FFT processing result corresponding to the one point selected by the selection means is used for demodulation processing;
   sampling means for sampling the received signal in a time domain; and
   distribution means for sequentially distributing time-series sampling results from the sampling means to m groups, where m is an integer equal to or more than two,
   wherein the FFT processing means executes FFT processing on respective sampling results of the m groups,
   wherein the selection means selects the one point from the m groups of points for each carrier based on the FFT processing results from the FFT processing means, said one point being a point at which a level of the FFT processing result for the carrier becomes maximum, and
   wherein the selection means includes for each carrier judge means which compares levels of power values of the FFT processing results with each other to determine that the point at which the level of the FFT processing result becomes a maximum value is an optimal point for the carrier.

3. A method for use in a receiver for processing an Orthogonal Frequency Division Multiplexing (OFDM) signal as a received signal including one or more carrier signals, comprising the steps of:
   executing Fast Fourier Transform (FFT) processing for the received signal to obtain FFT processing results at a plurality of points for each carrier; and
   selecting one point from plural points for each carrier based on the FFT processing results from the step of executing,
   wherein an FFT processing result at the point selected by the step of selecting is used for demodulation processing,
   wherein the step of executing executes the FFT processing on the received signal in a time domain for a sampling period of time which is m times an interval of the FFT process to thereby obtain FFT processing results at m points for each carrier, where m is an integer equal to or more than two,
   wherein the step of selecting selects one point from the m points for each carrier based on the FFT processing results from the step of executing, the one point being a point at which a level of the FFT processing result for the carrier becomes maximum, and
   wherein the selection means includes for each carrier judge means which compares levels of power values of the FFT processing results with each other to determine that the point at which the level of the FFT processing result becomes a maximum value is an optimal point for the carrier.

* * * * *